UNITED STATES PATENT OFFICE.

ALEXANDER MATHESON, OF LONDON, ENGLAND.

UTILIZATION OF ALUNITE ORE IN THE PROCESS OF MAKING SUPERPHOSPHATES.

1,413,048.     Specification of Letters Patent.     Patented Apr. 18, 1922.

No Drawing.     Application filed August 19, 1920. Serial No. 404,654.

*To all whom it may concern:*

Be it known that I, ALEXANDER MATHESON, a subject of the King of Great Britain, residing at 29 Devonshire Chambers, 146 Bishopsgate, in the city and county of London, England, have invented certain new and useful Improvements in Utilization of Alunite Ore in the Process of Making Superphosphates, of which the following is a specification This invention relates to the utilization of alunite ore for the purpose of making superphosphates and fertilizers.

A typical analysis of alunite is as follows:—

| | | |
|---|---|---|
| Potash ($K_2O$) | 7.70 | per cent. |
| Alumina ($Al_2O_3$) | 34.20 | " " |
| Sulphuric anhydride ($SO_3$) | 38.50 | " " |
| Silica ($SiO_2$) | 16.40 | " " |
| Ferric Oxide ($Fe_2O_3$) | 1.00 | " " |
| Water ($H_2O$) | 2.20 | " " |

All the known deposit of alunite contain from a minimum of 18 up to 38 per cent of sulphuric acid, and from a minimum of 4 up to 10 per cent of potash.

When alunite is roasted, or calcined, a proportion of the sulphuric acid (about 27 per cent of the $SO_3$ present) combines with the potassium, forming sulphate of potassium ($K_2SO_4$) and the rest is driven off in the form of sulphuric anhydride ($SO_3$), sulphur dioxide ($SO_2$), and oxygen (O), in proportions varying according to the temperature of the furnace.

According to this invention the alunite is roasted, in the absence of material quantities of air, at a temperature of about 700° C. to 900° C. and the mixture of sulphur gases is caused in the presence of sufficient water to form sulphuric acid to act on bones or minerals containing phosphate. The phosphates in the material so treated are in this manner converted very economically into the superphosphates, forming a valuable chemical manure or fertilizer.

The superphosphates may be prepared in the following manner:—

I may enclose alunite which has already been broken into cubes and calcined (and which preferably but not necessarily has been ground up to pass through a 40 mesh screen), along with phosphates also ground, in a retort tower or other suitable container, mixed together in the proportion required, having regard to the content in potash of phosphate of lime desired to be contained in the mixed fertilizer to be produced. The sulphur gases evolved from alunite in the process of calcination in a closed furnace, preferably one such as is hereinafter described, are then passed into and through the mixed phosphates and calcined alunite along with a spray of water or a jet of steam so regulated as to produce $H_2SO_4$ as before described until the mixture, while being turned over or otherwise agitated, becomes fully saturated with sulphuric acid.

Preferably the alunite, broken into cubes having faces of about one inch square, is calcined in an externally heated, muffled and mechanically rabbled furnace having hearths situated one above another, so arranged that the broken alunite is charged on the top hearth and continuously passed downwards from hearth to hearth to the lowest hearth from which it is finally discharged. Only the lowest hearth or the lower hearths is or are externally heated to a temperature of from 700° C. to 900° C. or thereabouts, and the $SO_3$, $SO_2$, and O evolved from the alunite in passing up over the other hearths gradually dry and heat the alunite thereon as the latter passes down to the lowest hearths and highest furnace heat. The $SO_2$ and O re-combine to form $SO_3$ as the gradually cooling gases come into contact with the iron oxide contained in the alunite on the upper hearths. At the same time, the ascending gases become gradually cooled so that on leaving the top of the furnace they are at a temperature convenient for further treatment or use. The furnace should be of such height and contain such a number of hearths as will effect the required degree of cooling of the ascending gases. In using these gases for the manufacture of superphosphates, I lead them direct into a closed retort tower or other suitable container, charged with phosphates until the requisite amount of $SO_3$ has been absorbed by the phosphates as indicated by test sampling.

The cooled gases are passed into the retort or tower along with a spray of water so regulated as to produce sulphuric acid. Any sulphurous acid ($H_2SO_3$) formed as the result of the incomplete recombination of the $SO_2$ and O in the upper portion of the furnace is readily oxidized to sulphuric acid in presence of the traces of iron compounds usually existing in sufficient quantity in the phosphates. At about 200° C. calcium superphosphate commences to break up into tricalcium phosphate and phosphoric acid. On cooling and storing reversal of the reaction takes place, the tricalcium phosphate and phosphoric acid reacting to give the desired superphosphates. A certain amount of potassium phosphate, varying with the conditions, may be also formed, enhancing the value of the product as a fertilizer. In fixing the proportion of alunite to phosphates in each charge, regard must be had to the amount of $SO_3$ available from the alunite and that required by the phosphates used, and also to the respective amounts of phosphoric acid and potassium required in the mixed fertilizer to be produced. The treated phosphates are stored in a bin or in open dumps under sheds, in the usual manner, in order that the reactions between the phosphate rock and the sulphuric acid may gradually take place and yield a dry pulverulent product. The oxidation of any residual sulphurous acid as mentioned above is facilitated by storage in open dumps. The formation of superphosphates by this process takes place rapidly.

In the above described process any water required to form the sulphuric acid is supplied either in the furnace or in the condensing apparatus, as may be found most suitable and may be injected as a spray or as steam. The question of whether any added water is required and if so what amount will depend upon the constituents of the alunite used and the moisture originally present.

What I claim and desire to secure by Letters Patent of the United States is:—

1. A process for producing superphosphates, which consists in roasting alunite in a furnace in the absence of material quantities of air to a temperature of about 700° C. to 900° C., withdrawing the sulphur gases emitted from the alunite from the furnace and passing the said gases through phosphate containing materials in the presence of sufficient water to form sulphuric acid from the gases.

2. A process for producing superphosphates which consists in subjecting alunite, in its passage through a furnace, to progressively increasing heat, in the absence of material quantities of air, to drive off its sulphur gases, passing said gases through the alunite in a direction opposite to that in which the alunite moves, drawing off the gases at the end of their travel through the alunite, and then passing the gases through phosphate containing materials in the presence of sufficient water to form sulphuric acid from the said gases.

ALEXANDER MATHESON.